(12) United States Patent
Martinez

(10) Patent No.: US 7,039,359 B2
(45) Date of Patent: *May 2, 2006

(54) RFID INTERROGATOR HAVING CUSTOMIZED RADIO PARAMETERS WITH LOCAL MEMORY STORAGE

(75) Inventor: Rene D. Martinez, Ossining, NY (US)

(73) Assignee: Intermec IP Corp., Woodland Hills, CA (US)

( * ) Notice: Subject to any disclaimer, the term of this patent is extended or adjusted under 35 U.S.C. 154(b) by 587 days.

This patent is subject to a terminal disclaimer.

(21) Appl. No.: 10/013,109

(22) Filed: Dec. 7, 2001

(65) Prior Publication Data

US 2002/0127970 A1    Sep. 12, 2002

Related U.S. Application Data

(60) Provisional application No. 60/251,908, filed on Dec. 7, 2000.

(51) Int. Cl.
*H04B 7/00* (2006.01)

(52) U.S. Cl. .................. 455/41.2; 455/456.1; 455/501
(58) Field of Classification Search ...... 455/41.1–41.3, 455/39, 42–44, 501, 456.1
See application file for complete search history.

(56) References Cited

U.S. PATENT DOCUMENTS

| | | | |
|---|---|---|---|
| 4,888,591 A | 12/1989 | Landt | |
| 5,349,332 A | 9/1994 | Ferguson | |
| 5,477,225 A | 12/1995 | Young | |
| 5,649,296 A | 7/1997 | MacLellan | |
| 5,777,561 A | 7/1998 | Chieu | |
| 5,784,686 A | 7/1998 | Wu | |
| 6,057,779 A | 5/2000 | Bates | |
| 6,122,329 A | 9/2000 | Zai | |
| 6,356,764 B1 * | 3/2002 | Ovard et al. | 455/456.2 |
| 6,639,509 B1 * | 10/2003 | Martinez | 340/10.4 |

OTHER PUBLICATIONS

Friedman, D. et al. "A Low-Power CMOS Integrated Circuit for Field-Powered Radio Frequency Identification Tags," IEEE International Sold State Circuits Conference, 1997, pp. 294-295; 474.

* cited by examiner

*Primary Examiner*—Barry W. Taylor
(74) *Attorney, Agent, or Firm*—O'Melveny & Myers LLP

(57) ABSTRACT

An RFID interrogator has a receiver/transmitter architecture that accounts for the variation in tolerances of radio system electrical components. The RFID interrogator includes a memory in which is stored desired initial condition data of the receiver/transmitter architecture, and this initial condition data is used upon initialization of the RFID interrogator to define the operational condition of the RFID interrogator. Each individual RFID interrogator may contain unique initial condition data corresponding to the particular component tolerances of that radio system.

18 Claims, 2 Drawing Sheets

RFID INTERROGATOR HAVING CUSTOMIZED RADIO PARAMETERS WITH LOCAL MEMORY STORAGE

RELATED APPLICATION DATA

This application claims priority pursuant to 35 U.S.C. § 119(e) to U.S. Provisional Application No. 60/251,908, filed Dec. 7, 2000.

BACKGROUND OF THE INVENTION

1. Field of the Invention

The present invention relates to radio frequency identification (RFID) interrogators and transponders, and more particularly, to a novel communication architecture for an RFID interrogator system.

2. Description of Related Art

In the automatic data identification industry, the use of RFID transponders (also known as RFID tags) has grown in prominence as a way to track data regarding an object to which the RFID transponder is affixed. An RFID transponder generally includes a semiconductor memory in which digital information may be stored, such as an electrically erasable, programmable read-only memory (EEPROMs) or similar electronic memory device. One technique for communicating with an RFID transponder is referred to as "backscatter modulation," in which the RFID transponder transmits stored data by modulating its antenna matching impedance in order to reflect varying amounts of an electromagnetic field provided by an RFID interrogator. The RFID transponders can therefore operate independently of the frequency of the energizing field, and as a result, the interrogator may operate at multiple frequencies so as to avoid radio frequency (RF) interference, such as utilizing frequency hopping spread spectrum modulation techniques. The RFID transponders may either extract power from the electromagnetic field provided by the interrogator, or may include their own internal power source (e.g., battery).

A drawback of RFID systems is that the backscatter-modulated signal reflected by the RFID transponder may contain relatively low power and limited dynamic range. Therefore, it is important for the RFID interrogator to minimize the noise in both the transmitted and received signal paths in order to achieve an acceptable read range and error rate of the received data. Variation in the tolerances of the electrical components within the RFID interrogator further tends to limit the accuracy of RF and DC parameters of the interrogator operation, thereby increasing susceptibility to noise in the signal paths. It is known in the art for radio designers to strive to create an architecture that minimizes the effect of the parameter variation, but in practice the desired tolerances are nevertheless exceeded.

Accordingly, it would be very desirable to provide an RFID interrogator having a receiver/transmitter architecture that accounts for the variation in tolerances of radio system electrical components.

SUMMARY OF THE INVENTION

The present application satisfies the need for an RFID interrogator having a receiver/transmitter architecture that accounts for the variation in tolerances of radio system electrical components. The RFID interrogator includes a memory in which is stored desired initial condition data of the receiver/transmitter architecture, and this initial condition data is used upon initialization of the RFID interrogator to define the operational condition of the RFID interrogator. Each individual RFID interrogator may contain unique initial condition data corresponding to the particular component tolerances of that radio system.

In an embodiment of the invention, an apparatus for interrogating an RFID tag comprises a radio adapted to communicate RF signals with the RFID tag. The radio includes a receiver portion and a transmitter portion. A processor is operatively coupled to the radio and provides control signals defining operational parameters of the radio. A memory is accessible by the processor and contains at least one data value used to set the operational parameters. The transmitter portion may further include an amplifier subsystem adapted to be operated in a saturated condition. The processor may further include at least one digital potentiometer defining a DC voltage supplied to the amplifier subsystem that controls an output power level of the amplifier subsystem, and the data value defines an initial setting of the digital potentiometer. The memory may further comprise a non-volatile memory, such as a CMOS electrically erasable programmable read only memory (EEPROM). The memory may be allocated into a plurality of memory blocks with at least one of said plurality of memory blocks including a cyclic redundancy code (CRC). At least one of the plurality of memory blocks may also be reserved for identification of the radio.

In another embodiment of the invention, a method is provided for setting operational parameters of an RFID tag interrogating apparatus that includes a processor and a radio having an amplifier. First, a bias condition of the amplifier is determined sufficient to achieve a saturated output power level for the amplifier. Second, a value is recorded of at least one digital potentiometer of the processor corresponding to the determined bias condition. Third, amplifier control signals are generated using the recorded digital potentiometer value.

A more complete understanding of the RFID interrogator having customized radio parameters with local memory storage will be afforded to those skilled in the art, as well as a realization of additional advantages and objects thereof, by a consideration of the following detailed description of the preferred embodiment. Reference will be made to the appended sheets of drawings that will first be described briefly.

DETAILED DESCRIPTION OF THE PREFERRED EMBODIMENT

The present application satisfies the need for an RFID interrogator having a receiver/transmitter architecture that accounts for the variation in tolerances of radio system electrical components. In the detailed description that follows, like element numerals are used to describe like elements illustrated in one or more of the figures.

Figure 1:
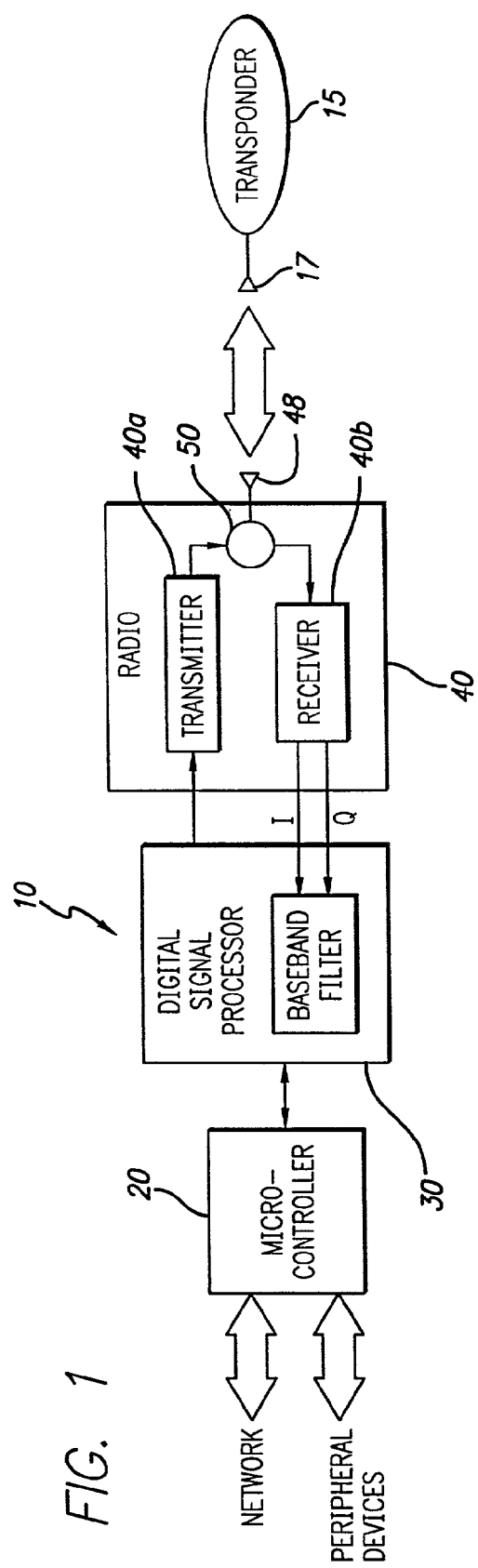
FIG. 1 is a block diagram of an RFID communication system including an RFID interrogator and tag.

Referring first to FIG. 1, an RFID interrogator 10 and tag 15 in accordance with the present invention are illustrated.

The interrogator 10 comprises a microcontroller module 20, a digital signal processor (DSP) module 30, and a radio module 40. The microcontroller module 20 provides control over high level operation of the interrogator 10 and communicates with an external network and peripheral devices. The DSP module 30 provides direct control over all operations of the radio module 40 in response to high level commands provided by the microcontroller module 20, and processes data signals received from the tag 15. The radio module 40 provides for RF communications to/from the tag 15. The tag 15 is disposed in proximity to the interrogator 10, and has an antenna 17 that reflects an RF backscattered signal in response to an RF transmission signal provided by the interrogator. The tag 15 may either be powered from the modulated electromagnetic field provided by the interrogator 10, or may contain its own internal power source, such as a battery.

More particularly, the radio module 40 further comprises a transmitter portion 40a, a receiver portion 40b, a hybrid 50, and an antenna 48. The hybrid 50 may further comprise a circulator. The transmitter portion 40a includes a local oscillator that generates an RF carrier frequency. The transmitter portion 40a sends a transmission signal modulated by the RF carrier frequency to the hybrid 50, which in turn passes the signal to the antenna 48. The antenna 48 broadcasts the modulated signal and captures signals radiated by the tag 15. The antenna 48 then passes the captured signals back to the hybrid 50, which forwards the signals to the receiver portion 40b. The receiver portion 40b mixes the captured signals with the RF carrier frequency generated by the local oscillator to directly downconvert the captured signals to a baseband information signal. The baseband information signal comprises two components in quadrature, referred to as the I (in phase with respect to the transmitted carrier) and the Q (quadrature, 90° out of phase with respect to the carrier) signals. The hybrid 50 connects the transmitter 40a and receiver 40b portions to the antenna 48 while isolating them from each other. In particular, the hybrid 50 allows the antenna 48 to send out a strong signal from the transmitter portion 40a while simultaneously receiving a weak backscattered signal reflected from the transponder 15.

Figure 2:
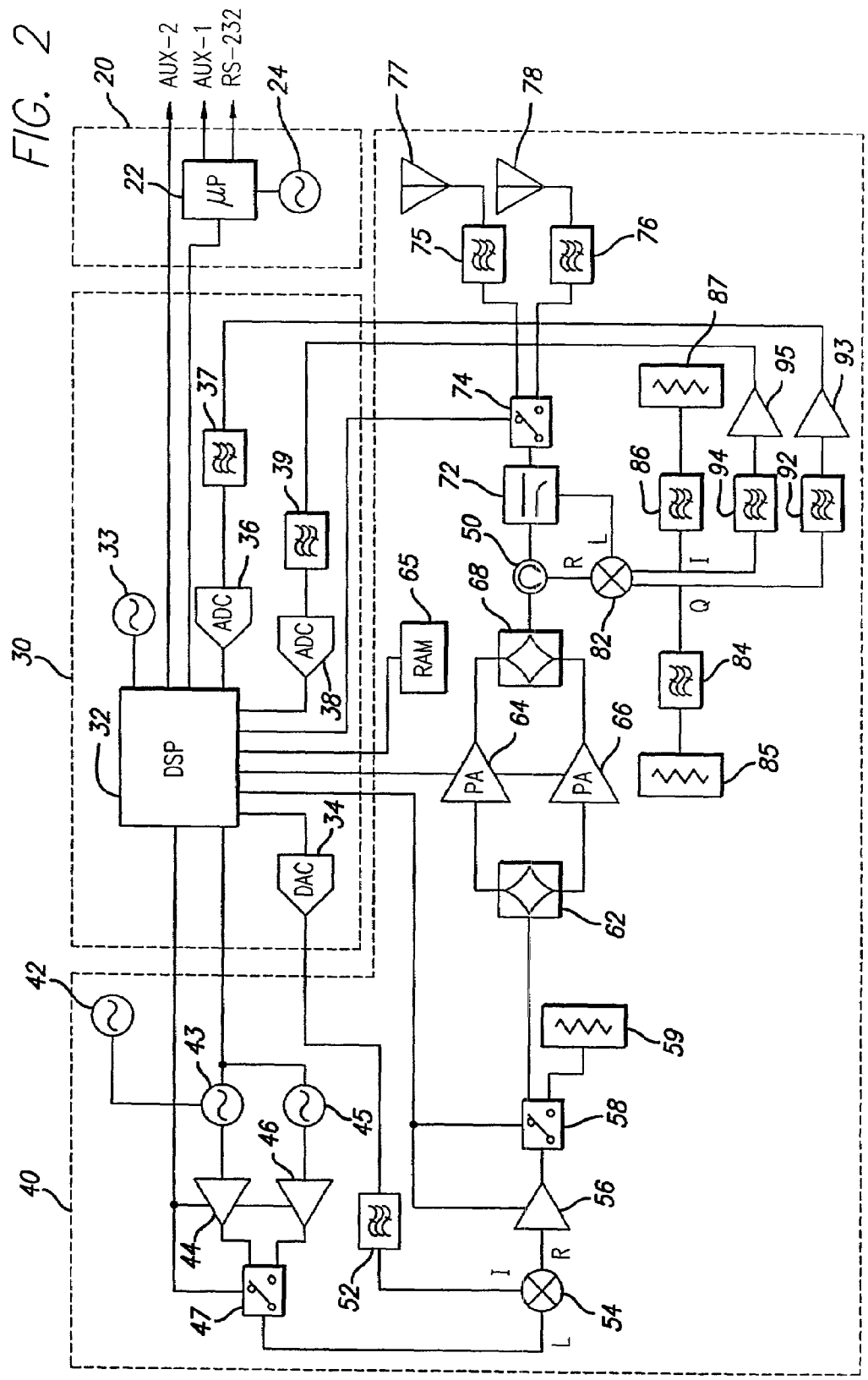
FIG. 2 is a block diagram of an exemplary embodiment of an RFID interrogator in accordance with the present invention.

Referring now to FIG. 2, an exemplary embodiment of the RFID interrogator is illustrated in greater detail. The microcontroller module 20 comprises a microprocessor (μp) 22 and a clock source 24 providing a clock signal to the microprocessor. As described above, the microprocessor 22 supervises the high-level operation of the RFID interrogator. External application level command sequences are provided to the microprocessor 22 through a serial RS-232 port. The microprocessor 22 interprets these external commands and constructs a sequence of lower level commands for execution by the DSP module 30. The microprocessor 22 further includes an external interface (AUX_1) that permits another device, such as an infrared (IR) detector, to trigger the RFID interrogator to execute a command.

The DSP module 30 comprises a DSP 32, a clock source 33 providing a clock signal to the DSP, a digital-to-analog converter (DAC) 34, analog-to-digital converters (ADC) 36, 38, and band-pass filters 37, 39. As described above, the DSP 32 receives commands from the microprocessor 22 and controls the radio module 40. The DSP 32 includes an external interface (AUX_2) that may be used to permit another device to directly control the DSP, such as to disable operation of the radio module 40. The DSP 32 provides a digital data output signal to the DAC 34 for modulating a carrier to transmit signals to the RFID transponder, as will be further described below. Received I and Q signals from the radio module 40 pass through the respective band-pass filters 37, 39, and are converted to digital signals by the respective ADCs 36, 38. The bandpass filters 37, 39 may be provided by cascaded high-pass filters and low-pass filters. The DSP 32 processes the digitized and filtered I and Q signals to recover the bit clock and encoded data, and provide the recovered data to the microcontroller module 20.

The radio module 40 further comprises several subsystems, including an RF source subsystem, a modulator subsystem, an amplifier subsystem, a receiver subsystem, and an antenna connection subsystem. It should be appreciated that the RF source subsystem, the modulator subsystem and the amplifier subsystem correspond generally to the transmitter 40a of FIG. 1, and the receiver subsystem corresponds generally to the receiver 40b of FIG. 1. These subsystems of the radio module 40 are provided with various noise reducing features. Each of these subsystems and their noise reducing features are described in further detail below.

In the RF source subsystem, two synthesized phase locked loop (PLL) sources work together to provide a single RF carrier signal with a fast ($\leq 26$ μs) hopping time for frequency hopping spread spectrum operation. The RF source subsystem comprises a clock source 42, synthesized PLL sources 43, 45, amplifiers 44, 46, and switch 47. The clock source 42 provides a reference signal (e.g., 12 MHz) for the synthesized PLL sources 43, 45, and the DSP 32 programs the frequency channel of each PLL source into the desired band (e.g., 2.4 GHz). The amplifiers 44, 46 are connected to the PLL sources 43, 45, respectively, and provide buffering of the synthesizer outputs to prevent frequency pulling. The amplifiers 44, 46 are selectively enabled/disabled by control signals provided by the DSP 32. The switch 47 is controlled by the DSP 32 to select one of the synthesizer outputs to pass to the modulator subsystem (described below) as the RF carrier. A frequency hop sequence follows the steps of: 1) disabling the amplifier subsystem (described below); 2) selecting one of the synthesizers by operation of the switch 47; and 3) enabling the amplifier subsystem. The steps of disabling/enabling the amplifier subsystem prevents RF outputs from the RFID interrogator while in the process of hopping to a new channel.

The modulator subsystem modulates an information signal onto the selected RF carrier from the RF source subsystem using on-off key modulation, wherein full amplitude corresponds to an on state (e.g., logical one) and zero amplitude corresponds to an off state (e.g., logical zero). In an embodiment of the RFID interrogator, the modulator subsystem includes plural cascading modulation components in order to increase the dynamic range between the on and off states of the modulating signal. The dynamic range of any single stage may be limited by the leakage in the stage or the symmetry of devices in the stage. More particularly, the modulator subsystem comprises a low-pass filter 52, a mixer 54, an amplifier 56, a switch 58 and a resistor termination 59. The output from the DAC 34 controls the amplitude of the carrier, i.e., between the on and off states. The low-pass filter 52 attenuates modulated signals that have high offset frequencies ($\geq 1$ MHz) relative to the carrier. The mixer 54 has a local oscillator input (L), an intermediate frequency input (I), and an RF output (R). The carrier is coupled to the local oscillator input L and the low-pass filtered information signal from the DSP 32 is coupled to the intermediate frequency input I. The mixer 54 multiplies the carrier with the information signal to yield a modulated signal present at the RF output R.

To further increase the dynamic range of the modulated signal, the modulated signal passes through two subsequent modulation stages. Following the mixer 54, the modulated signal passes through the amplifier 56 and switch 58. Both of these elements are directly controlled by the DSP 32 in unison. During on states of the modulated signal, the amplifier 56 is energized by the DSP to amplify the modulated signal and the switch 58 passes the amplified modulated signal therethrough to the amplifier subsystem (described below). Conversely, during off states of the modulated signal, the amplifier 56 is shut off by the DSP and the switch 58 passes the residual signal that leaks past the amplifier into the resistor termination 59. The resistor termination 59 absorbs the residual leakage signal from the amplifier. By passing the modulated signal through plural modulation stages that are gated in unison, the dynamic range of the modulated signal between on and off states may be increased to as much as 50 dB. The modulated signal v(t) that passes to the transmitter amplifier subsystem contains an almost imperceptible amount of carrier leakage at the off states.

The modulated signal is amplified to a desired level for transmission by the amplifier subsystem. The amplified modulated signal then passes through the circulator 50 to the antenna connection subsystem (described below). Leakage of the transmitted signal into the receiver subsystem is a source of noise, and the amount of such leakage is determined by the quality of the match between the amplifier subsystem and the circulator 50. In order to improve the match between the amplifier subsystem and the circulator 50, two individual power amplifiers and two 90° couplers are combined to create a single high power amplifier that has twice the output power capacity and better matching characteristics than the individual amplifiers.

More particularly, the amplifier subsystem comprises quadrature hybrids 62, 68 and power amplifiers 64, 66. The first quadrature hybrid 62 splits the modulated signal at the input of the amplifier subsystem into two signals differing in phase by 90°. The two signals are coupled into the power amplifiers 64, 66, respectively. The gain of the power amplifiers 64, 66 is controlled by control signals provided by the DSP 32. After being amplified to a desired power level, the amplified signals are recombined by the second quadrature hybrid 68 at the output of the amplifier subsystem. Each one of the quadrature hybrids 62, 68 has an isolated port coupled to a respective resistor termination. Reflected power from the power amplifiers 64, 66 in either the forward or reverse directions is coupled through the isolated ports of the quadrature hybrids 62, 68 and into the resistor termination for attenuation. The quadrature combination of the ampified signals serves to reduce even harmonics of the combined signal and improves the return loss of the input and output to the amplifier subsystem.

The radio module 40 has parameters specific to each individual radio that are stored in a non-volatile random access memory (RAM) 65. The power amplifiers 64, 66 operate in a saturated gain mode, and in this mode, the output power is determined by the voltage bias on the amplifier provided by digital potentiometers within the DSP 32. The value of each digital potentiometer defines a DC voltage supplying the power amplifiers 64, 66, and thereby limits the RF voltage swing on the output of the power amplifiers. For this desired limiting condition to occur, the RF input power level into the power amplifiers 64, 66 must place the amplifiers in the "saturated" portion of the operating range.

Moreover, since the RFID interrogator receives and transmits signals simultaneously, received signals are processed at frequencies that may be slightly offset from the transmitted signal. At very low offset frequencies, amplitude and phase noise from within the radio module 40 of the RFID interrogator may cause noise and/or interference to detecting and receiving signals. Amplitude noise can propagate through the transmitter 40a to the receiver 40b without any attenuation relative to the desired received signal. By placing the power amplifiers 64, 66 in a gain saturated state, the amplitude fluctuations in the transmitted signal are greatly reduced.

Figure 3:
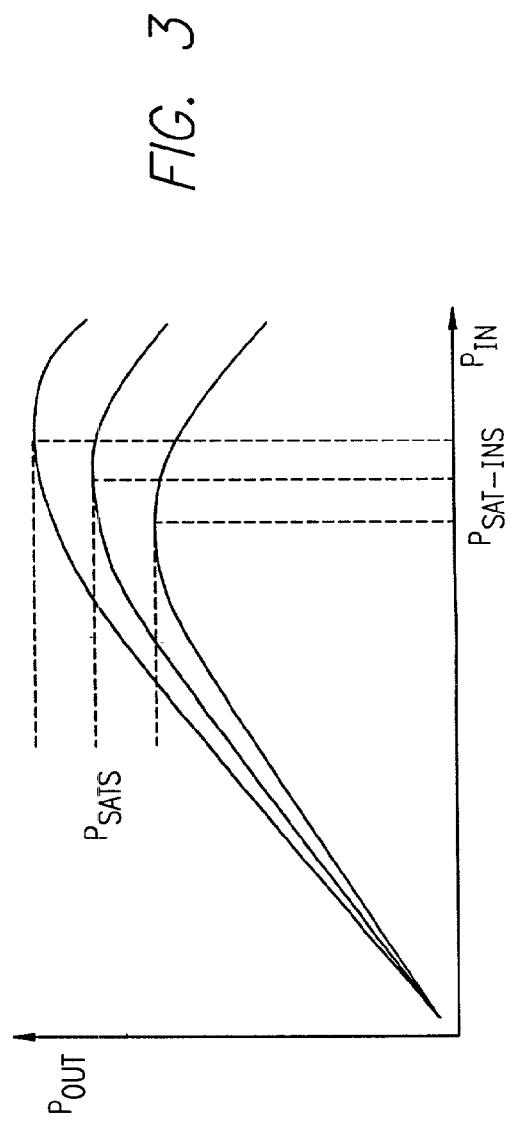
FIG. 3 is a graph illustrating amplifier output power versus input power for three different exemplary bias conditions.

Referring now to FIG. 3, a graph illustrating amplifier output power versus input power for three different bias conditions is shown. As known in the art, amplifiers typically operate in a linear region in which the output power is proportional, by its gain, to the input power so as the input power increases, the output power also increases. The ratio of output power to the input power is referred to as the gain of the amplifier. When the input power increases without bound, the amplifier moves out of the linear region and the output power thereby increases with a smaller gain. As the input power keeps increasing, the output power reaches a maximum level, known as the saturated output power level. Further increases in the input power after the output power has saturated may actually cause a decrease in output power. At the saturated output power level, the amplifier has a differential gain of zero, wherein an infinitesimal change in the input power will not change the output power.

The saturated output power depends on the DC bias conditions on the amplifier, and as the DC voltage supply bias to the power amplifiers 64, 66 increases, the saturated power also increases. The graph of FIG. 3 shows three different saturated power levels for the power amplifiers 64, 66, and it should be appreciated that the input power necessary for saturating the power amplifiers differs for each bias condition. The input power into the amplifier subsystem is indirectly controlled by the analog modulation voltage into the transmit mixer 54. As the magnitude of the analog modulation increases, the input power into the power amplifiers 64, 66 also increases.

Ideally, the saturated output power is set just under the 30.0 dBm power limit defined by the Federal Communication Commission (FCC) regulations to obtain maximum range for non-battery powered RFID transponders. As illustrated in FIG. 3, the saturated power level is a nonlinear function of the bias conditions and the input power. Unfortunately, the bias conditions and input power set by the digital potentiometer and analog modulation levels cannot be readily determined with a closed form relationship. Nevertheless, the nonlinear relationship is Known, and therefore a manual or automated process can be used to determine the digital potentiometer and analog modulation settings for the desired saturated output power level.

More particularly, an exemplary process comprises six steps. First, the bias condition is set with a digital potentiometer value. Second, the input power level is swept by changing the analog modulation voltage from low (e.g., 0 volts) to high (e.g., 4 volts) in order to determine the maximum output power level (corresponding to the saturated output power level for the given potentiometer value). Third, if the saturated output power level is below or above the desired power level, the value of the digital potentiometer is respectively increased or decreased, and the second step is then repeated. Fourth, after the saturated power level is within the desired level, the digital potentiometer level is recorded in the non-volatile memory 65. This recorded value is thereby retained for the subsequent steps of the process. Fifth, in preparation for finding the proper analog modulation voltage, a "droop" level is selected (e.g., 0.20 dB) such that the output will droop below the saturated output power level. The saturated output power minus the droop level measured in dB serves as a target output power level for the next step. Sixth, the analog modulation is swept from low to high, and the two analog modulation voltages that place the output of the amplifier at the target level in the fifth step are recorded. Seventh, the average of the two voltages in the sixth step becomes the desired analog modulation voltage that places the amplifier at the saturated output power level with zero differential gain. The average value is recorded in the non-volatile memory 65, then set and verified so that the average is the proper analog modulation voltage. It is anticipated that prior knowledge of approximate values for the digital potentiometer and analog modulation settings can reduce the time for the process to under five minutes, and computer automation can reduce the process time even further.

Operating the power amplifiers 64, 66 in the saturated mode is advantageous for two reasons. First, the output power over temperature is extremely stable since the DC voltage regulators effectively control the RF output power in the saturated mode, and the regulators are temperature stabilized. Second, since the saturated mode provides a differential gain of zero, any amplitude fluctuations that would leak into the receiver subsystem and cause interference are virtually eliminated from the amplifier output signal.

Upon initialization of the interrogator 10, the DSP 32 reads the various radio settings stored in the non-volatile memory 65. The radio settings are used to initialize the DSP variables, which are in turn used to set the digital potentiometers used to program the radio output power level. The non-volatile memory 65 may be provided by a CMOS EEPROM having 1K bits of memory. For clear usage and for protections purposes, the non-volatile memory 65 is allocated by software into eight 16-byte blocks with the last two bytes in each block comprising a 16-bit CCITT CRC. The first two blocks may be reserved for radio identification. The third block may be used to store radio parameters, and the remaining blocks may be reserved for future use. Exemplary radio parameters may include digital potentiometer gain, analog mixer (high and low bytes), I-channel DC threshold (high and low bytes), Q-channel DC threshold (high and low bytes), and power detect threshold (high and low bytes).

Returning again to FIG. 2, the circulator 50 separates and isolates the outgoing transmitted signals and incoming received signals. Transmitted signals pass through a directional coupler 72 to the antenna connection subsystem, which couples the transmitted signals into a selected antenna for transmission to an RFID transponder. The antenna connection subsystem comprises an RF switch 74, low-pass filters 75, 76, and antennas 77, 78. The RF switch 74 is controlled by the DSP 32 to select one of the two antennas 77, 78 for operation. Before the transmitted signals reach the antennas 77, 78, the low-pass filters 75, 76 attenuate the harmonics of the RF fundamental frequency to prevent excessive emissions into FCC restricted frequency bands.

Similarly, received signals pass from the antennas 77, 78 through the directional coupler and the circulator to the receiver subsystem. The receiver subsystem demodulates the received signals and passes the demodulated signals to the DSP 32 for data processing. In a preferred embodiment of the invention, the received signals are demodulated in a homodyne mode and are thereby directly downconverted to baseband without the use of intermediate frequency (IF) demodulation stages. More particularly, the receiver subsystem comprises mixer 82, high-pass filters 84, 86, resistor terminations 85, 87, low-pass filters 92, 94 and low noise amplifiers 93, 95. The mixer 82 has a local oscillator input (L), an RF input (R), and I and Q outputs. The received signal passes through the circulator 50 and is coupled to the RF input R. The carrier passes through the circulator 50 in the opposite direction of the received signal, and is coupled by the directional coupler 72 into the local oscillator input L. The mixer 54 multiplies the carrier with the received RF signal to yield demodulated I and Q signal components. The I and Q signal components pass through the low-pass filters 94, 92 and low noise amplifiers 95, 93, respectively, and are provided to the DSP module 30. Within the DSP module 30, the low-pass filtered I and Q signal components pass through the band-pass filters 39, 37, respectively. The bandwidth of these band-pass filters 39, 37 correspond to the single-sideband bandwidth of the receiver channel bandwidth (e.g., 200 kHz). The outputs of these band-pass filters 39, 37 are then sampled by ADCs 38, 36 and fed into the DSP 32.

The I and Q outputs of the mixer 82 are further coupled to the high-pass filters 86, 84, which are in turn coupled to respective resistor terminations 87, 85. The power from the fundamental carrier frequency and its harmonics are absorbed by the resistor terminations 87, 85, while the low frequency data signals from the RFID transponder are not attenuated. More particularly, the carrier frequency may be expressed as sin ωt, and the received RF signal may be expressed as A(t) sin ωt. The I signal component represents the carrier frequency multiplied with the received RF signal, as follows:

$$I(t)=A(t)\sin^2\omega t$$

which may be further expressed as:

$$I(t)=\tfrac{1}{2}(A(t)+A(t)\sin 2\omega t)$$

The first element of the expression, A(t)/2, represents the low frequency portion of the signal component I, and the second element of the expression, ½(A(t)sin 2ωt), represents the high frequency portion of the signal component I. It should be appreciated that the Q signal component is calculated in a similar manner, except that it contains a phase shift of 90°. Thus, the low-pass filters 92, 94 permit the low frequency portion of the signal component to pass to the DSP 32, and the high-pass filters 84, 86 permit the high frequency portion of the signal components to pass to the resistor terminations 85, 87. The resistor terminations 85, 87 attenuate the high frequency portion of the signal components in order to prevent its reflection back to the mixer 82. By absorbing the high frequency power, the receiver subsystem prevents the carrier and its harmonics from mixing together and generating noise or interference at baseband frequencies at which the RFID transponder signals are to be processed.

The proper placement of the reference signal (i.e., carrier) that drives the mixer 82 can minimize and/or eliminate phase noise sources as the predominant source of interference. Ideally, the reference signal should be coupled from a location that is proportional to the leakage into the RF input R of the mixer 82. Accordingly, the directional coupler 72 that provides the reference signal is disposed in close proximity to the source of leakage, as shown in FIG. 2.

Having thus described a preferred embodiment of a system and method for communication with an RFID transponder, it should be apparent to those skilled in the art that certain advantages of the within system have been achieved.

It should also be appreciated that various modifications, adaptations, and alternative embodiments thereof may be made within the scope and spirit of the present invention.

What is claimed is:

1. An apparatus for interrogating an RFID tag, comprising:
   a radio adapted to communicate RF signals with said RFID tag, said radio including a receiver portion and a transmitter portion, said transmitter portion having an amplifier subsystem adapted to be operated in a saturated gain state;
   a processor operatively coupled to said radio and providing control signals defining operational parameters of said radio; and
   a memory accessible by said processor and containing at least one data value used to set said operational parameters, said at least one data value comprising an optimal setting of said amplifier subsystem selected to achieve said saturated gain state upon initialization of said radio.

2. The apparatus of claim 1, wherein said processor comprises at least one digital potentiometer defining a DC voltage supplied to said amplifier subsystem that controls an output power level of said amplifier subsystem, and said at least one data value further defines an initial setting of said at least one digital potentiometer.

3. The apparatus of claim 2, wherein said amplifier subsystem further comprises at least one power amplifier having a gain determined by said at least one digital potentiometer of said processor.

4. The apparatus of claim 2, wherein said amplifier subsystem further comprises first and second quadrature hybrids and first and second power amplifiers, said first quadrature hybrid splitting a modulated signal into two signals differing in phase by 90° and provided to said first and second power amplifiers, respectively, said second quadrature hybrid thereafter recombining amplified output signals from said first and second amplifiers.

5. The apparatus of claim 4, wherein said amplifier subsystem further comprises a resistor termination connected to at least one of said first and second quadrature hybrids for attenuating reflected power from at least one of said first and second power amplifiers.

6. The apparatus of claim 1, wherein said memory further comprises a non-volatile memory.

7. The apparatus of claim 1, wherein said memory further comprises a CMOS electrically erasable programmable read only memory (EEPROM).

8. The apparatus of claim 1, wherein said memory is allocated into a plurality of memory blocks with at least one of said plurality of memory blocks including a cyclic redundancy code (CRC).

9. The apparatus of claim 8, wherein at least one of said plurality of memory blocks is reserved for identification of said radio.

10. The apparatus of claim 8, wherein at least one of said plurality of memory blocks is reserved for at least one data value.

11. In an apparatus for interrogating an RFID tag comprising a radio for communicating RF signals and having an amplifier, and a processor operatively coupled to said radio and providing control signals defining operational parameters of said amplifier, a method for setting said operational parameters comprises:
   determining a bias condition of said amplifier sufficient to achieve a saturated output power level for said amplifier;
   recording a value of at least one digital potentiometer of said processor corresponding to said determined bias condition; and
   generating said control signals using said recorded digital potentiometer value.

12. The method of claim 11, wherein said determining step further comprises sweeping an input power level applied to said amplifier from low to high in order to determine said saturated output power level for said amplifier.

13. The method of claim 11, wherein said recording step further comprises recording said at least one digital potentiometer value in a non-volatile memory.

14. The method of claim 13, further comprising allocating said memory into a plurality of memory blocks with at least one of said plurality of memory blocks including a cyclic redundancy code (CRC).

15. The method of claim 14, further comprising reserving at least one of said plurality of memory blocks for identification of said radio.

16. The method of claim 11, wherein said amplifier further comprises at least one power amplifier, and said determining step further comprises determining a gain of said at least one power amplifier.

17. In an apparatus for interrogating an RFID tag comprising a radio for communicating RF signals and having an amplifier, and a processor operatively coupled to said radio and providing control signals defining operational parameters of said amplifier, a method for setting said operational parameters comprises:
   determining a bias condition of said amplifier sufficient to achieve a saturated output power level for said amplifier;
   recording a value of at least one digital potentiometer of said processor corresponding to said determined bias condition, wherein said recording step further comprises recording said at least one digital potentiometer value in a non-volatile memory;
   generating said control signals using said recorded digital potentiometer value;
   allocating said memory into a plurality of memory blocks with at least one of said plurality of memory blocks including a cyclic redundancy code (CRC); and
   reserving at least one of said plurality of memory blocks for said at least one digital potentiometer value.

18. In an apparatus for interrogating an RFID tag comprising a radio for communicating RF signals and having an amplifier, and a processor operatively coupled to said radio and providing control signals defining operational parameters of said amplifier, a method for setting said operational parameters comprises:
   determining a bias condition of said amplifier sufficient to achieve a saturated output power level for said amplifier;
   recording a value of at least one digital potentiometer of said processor corresponding to said determined bias condition wherein said recording step further comprises recording said at least one digital potentiometer value in a non-volatile memory;
   generating said control signals using said recorded digital potentiometer value; and
   wherein said generating step further comprises retrieving said at least one digital potentiometer value from said non-volatile memory during an initialization of said apparatus.

* * * * *